United States Patent
Milligan et al.

(10) Patent No.: US 7,073,038 B2
(45) Date of Patent: Jul. 4, 2006

(54) APPARATUS AND METHOD FOR IMPLEMENTING DYNAMIC STRUCTURE LEVEL POINTERS

(75) Inventors: Charles A. Milligan, Golden, CO (US); Thomas Nelson Noland, Louisville, CO (US); Leslie K. Hodge, Westminster, CO (US)

(73) Assignee: Storage Technology Corporation, Louisville, CO (US)

( * ) Notice: Subject to any disclaimer, the term of this patent is extended or adjusted under 35 U.S.C. 154(b) by 196 days.

(21) Appl. No.: 10/155,612

(22) Filed: May 22, 2002

(65) Prior Publication Data

US 2003/0221076 A1    Nov. 27, 2003

(51) Int. Cl.
G06F 12/00    (2006.01)
(52) U.S. Cl. .................. 711/165; 711/162; 711/161; 711/207; 707/204
(58) Field of Classification Search ................ 711/165, 711/207
See application file for complete search history.

(56) References Cited

U.S. PATENT DOCUMENTS

| | | | | |
|---|---|---|---|---|
| 5,418,929 A * | 5/1995 | Tsuboi et al. | ................ | 711/171 |
| 6,715,050 B1 * | 3/2004 | Williams et al. | ............ | 711/164 |
| 6,732,124 B1 * | 5/2004 | Koseki et al. | ............... | 707/202 |
| 2003/0140204 A1 * | 7/2003 | Ashton et al. | ............... | 711/162 |

OTHER PUBLICATIONS

Selkirk et al., Apparatus and Method for Instant Copy of Data, Jun. 19, 2001.
Selkirk et al., Apparatus and Method for Instant Copy of Data in a Dynamically Changeable Virtual Mapping Environment, Jun. 19, 2001.

* cited by examiner

*Primary Examiner*—Mano Padmanabhan
*Assistant Examiner*—Midys Rojas
(74) *Attorney, Agent, or Firm*—Yee & Associates, P.C.

(57) ABSTRACT

An apparatus and method for implementing structure level pointers in a data storage system are provided. With the apparatus and method, a compound pointer system is provided in which fixed level pointers are augmented with associated pointers to metadata describing lower level structures. The companion metadata describes these lower level structures in a manner independent of the actual data stored within the lower level structures. With such an enhanced compound pointer system, an instant copy mechanism can process the pointers to the underlying structures and take instant copies of much finer detail. This allows individual records of data to be represented by the pointer system without having the overhead of carrying a pointer to all the individual records. The instant copy mechanism not only copies the fixed level pointers, but resolves the companion pointers to individual subsets of a general granularity for the instances of the instant copy domains.

33 Claims, 4 Drawing Sheets

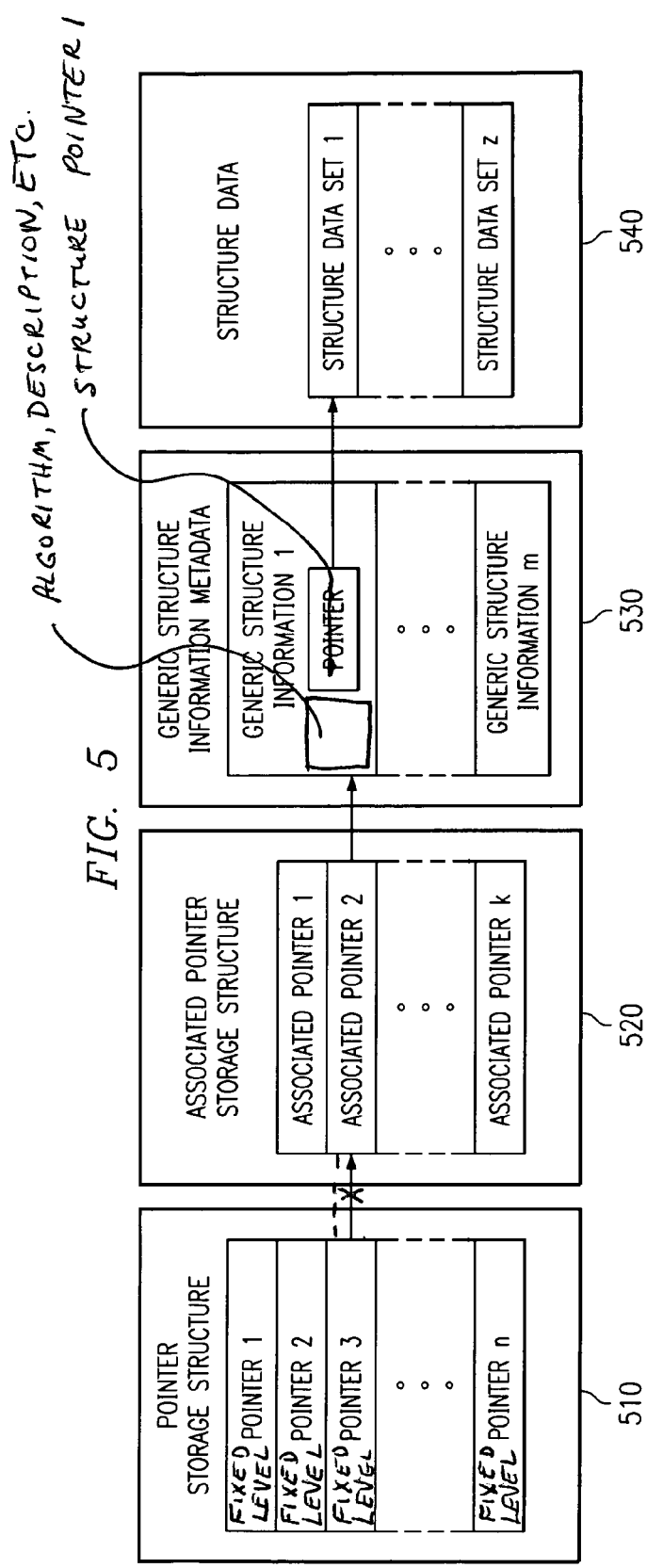

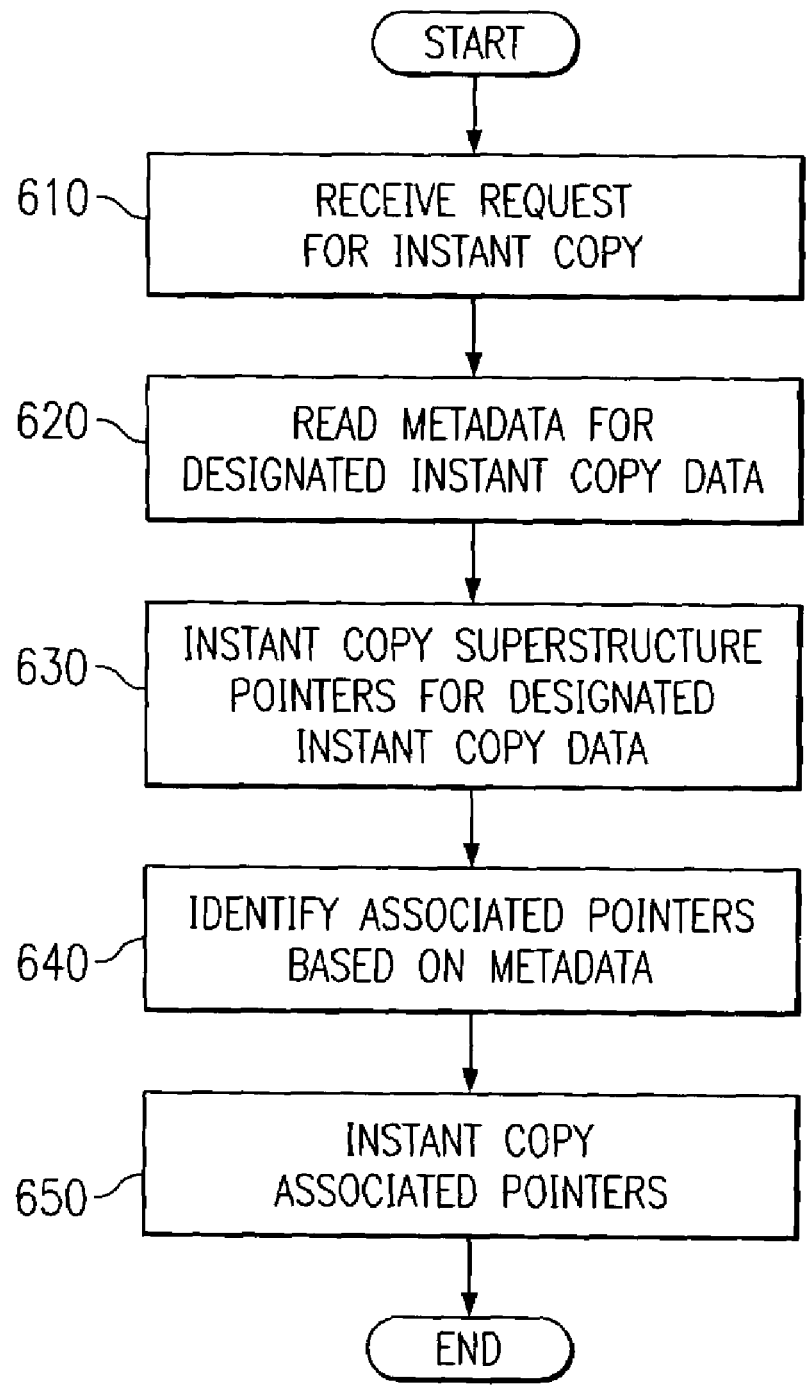

APPARATUS AND METHOD FOR IMPLEMENTING DYNAMIC STRUCTURE LEVEL POINTERS

RELATED APPLICATIONS

The present application is related to commonly assigned and copending U.S. patent application entitled "APPARATUS AND METHOD FOR INSTANT COPY OF DATA," Ser. No. 09/884,822, and U.S. patent application entitled "APPARATUS AND METHOD FOR INSTANT COPY OF DATA IN A DYNAMICALLY CHANGEABLE VIRTUAL MAPPING ENVIRONMENT," Ser. No. 09/884,687, both of which filed on Jun. 19, 2001 and hereby incorporated by reference.

BACKGROUND OF THE INVENTION

1. Technical Field

The present invention is directed to an apparatus and method for implementing structure level pointers. More specifically, the present invention is directed to implementing structure level pointers such that an instant copy of data at a fine granularity may be performed.

2. Description of Related Art

In computer systems and data storage subsystems, one problem is performing a data file copy operation in a manner that minimizes the use of processing resources and data storage memory. Previously, data files were copied in their entirety by the processor, such that two exact copies of the selected data file were resident in the data storage memory. This operation consumed twice the amount of memory for the storage of two identical copies of the data file. Additionally, this operation required the intervention of the processor to effect the copy of the original data file.

A data file instant, or snapshot, copy is an improvement over this type of copy process. This instant copy process includes a dynamically mapped virtual data storage subsystem. This subsystem stores data files received from a processor in back-end data storage devices by mapping the processor assigned data file identifier to a logical address that identifies the physical storage location of the data. This dynamically mapped virtual data storage subsystem performs a copy of a data file by creating a duplicate data file pointer to a data file identifier in a mapping table to reference the original data file. In this dynamically mapped virtual data storage subsystem, the data files are referred to as a collection of "virtual tracks" and each data file is identified by unique virtual track addresses (VTAs).

The use of a mapping table provides the opportunity to replace the process of copying the entirety of a data file in the data storage devices with a process that manipulates the contents of the mapping table. A data file appears to have been copied if the name used to identify the original data file and the name used to identify the copy data file are both mapped to the same physical data storage location.

This mechanism enables the processor to access the data file via two virtual track addresses while only a single physical copy of the data file resides on the back-end data storage devices in the data storage subsystem. This process minimizes the time required to execute the copy operation and the amount of memory used since the copy operation is carried out by creating a new pointer to the original data file and does not require any copying of the data file itself.

One implementation of the instant, or snapshot, copy process provides a two-table approach. One table has table entries for each virtual device track pointing to another table containing the physical track location for the entry. Each physical track table entry identifies the number of virtual track entries that point to this entry by use of a reference count mechanism. Each virtual track entry that points to the physical track is called a "reference." The reference count increments when a new virtual track table entry pointer points to this physical entry (e.g. snap) and the reference count decrements when a virtual track table entry pointer is removed (e.g. update source after a snap). When a reference count is zero, then that physical track can be deleted from the back-end since it is known that there are no references to the physical track.

With instant copy mechanisms, however, the pointers are at some fixed level of data structure granularity, e.g., track, cylinder, or volume level pointers. This limits the usefulness of the instant copy to those functions that can operate at a fixed level of pointer granularity.

Moreover, data may be written at much smaller granularities, e.g., individual records, than the cylinder, volume, and even track levels that are used in instant copy processes. However, it is impractical to have a pointer system that points to data at a record level since such a pointer system would have an enormous number of pointers causing any benefit that might possibly be obtained from the pointer system to be completely negated by the processing necessary to maintain the pointer system. As a result, it would be beneficial to have an apparatus and method for implementing a structure level pointers that are not fixed and that a can achieve fine granularities without requiring enormous numbers of pointers.

SUMMARY OF THE INVENTION

The present invention provides an apparatus and method for implementing structure level pointers in a data storage system. With the present invention, a compound pointer system is provided in which fixed level pointers are augmented with associated pointers to metadata describing lower level structures. With the present invention, the companion metadata describes these lower level structures in a manner independent of the actual data stored within the lower level structures. With such an enhanced compound pointer system, an instant copy mechanism can process the pointers to the underlying structures and take instant copies of much finer detail. This allows individual records of data to be represented by the pointer system without having the overhead of carrying a pointer to all the individual records. The instant copy mechanism not only copies the appropriate fixed level pointers, but resolves the companion pointers to individual subsets of a general granularity for the instances of the instant copy domains.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 5 is a diagram illustrating an implementation of an associated pointer storage structure in accordance with the present invention; and FIG. 6 is a flowchart outlining an exemplary operation of the present invention when performing an instant copy of data.

DETAILED DESCRIPTION OF THE PREFERRED EMBODIMENT

Figure 1:
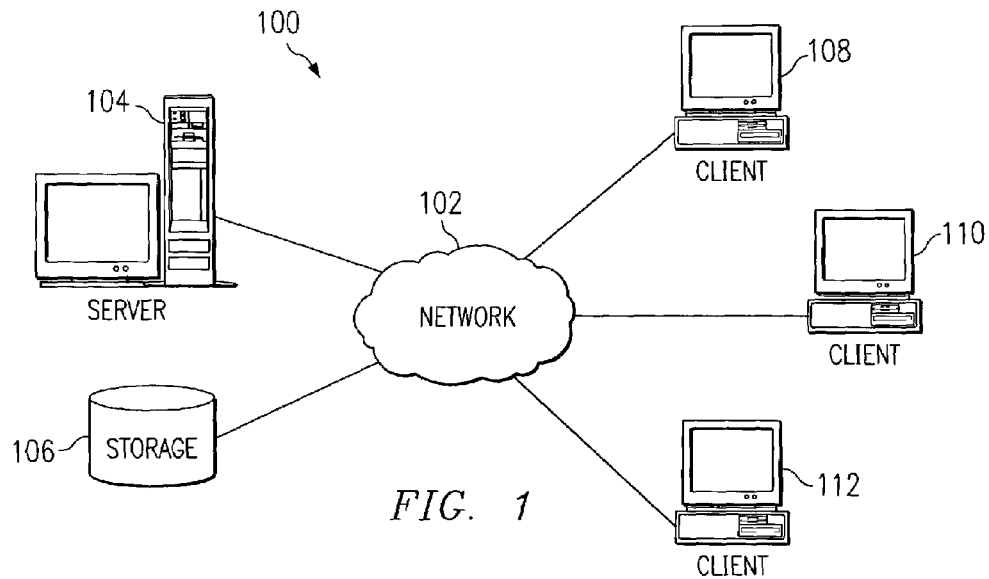
FIG. 1 is an exemplary block diagram of a network computing environment in which the present invention may be implemented.

With reference now to the figures, FIG. 1 depicts a pictorial representation of a distributed data processing system in which the present invention may be implemented. Distributed data processing system 100 is a network of computers in which the present invention may be implemented. Distributed data processing system 100 contains a network 102, which is the medium used to provide communications links between various devices and computers connected together within distributed data processing system 100. Network 102 may include permanent connections, such as wire or fiber optic cables, or temporary connections made through telephone or wireless connections.

In the depicted example, a server 104 is connected to network 102 along with storage subsystem 106. In addition, clients 108, 110, and 112 also are connected to network 102. These clients 108, 110, and 112 may be, for example, personal computers or network computers. For purposes of this application, a network computer is any computer, coupled to a network, which receives a program or other application from another computer coupled to the network. In the depicted example, server 104 provides data, such as boot files, operating system images, and applications to clients 108–112. Clients 108, 110, and 112 are clients to server 104. Distributed data processing system 100 may include additional servers, clients, and other devices not shown. Distributed data processing system 100 may be implemented as one or more of a number of different types of networks, such as, for example, an intranet, a local area network (LAN), or a wide area network (WAN). Network 102 contains various links, such as, for example, fiber optic links, packet switched communication links, enterprise systems connection (ESCON) fibers, small computer system interface (SCSI) cable, wireless communication links. In these examples, storage subsystem 106 may be connected to server 104 using ESCON fibers. FIG. 1 is intended as an example and not as an architectural limitation for the present invention.

Figure 2:
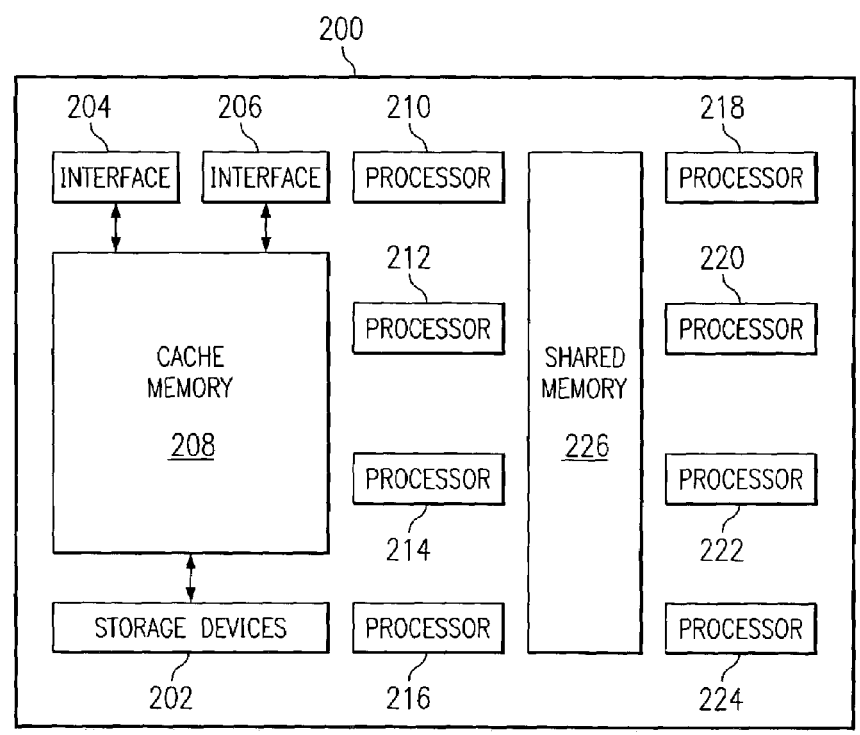
FIG. 2 is an exemplary block diagram of a storage subsystem in accordance with a preferred embodiment of the present invention.

Turning next to FIG. 2, a block diagram of a storage subsystem is depicted in accordance with a preferred embodiment of the present invention. Storage subsystem 200 may be used to implement storage subsystem 106 in FIG. 1. As illustrated in FIG. 2, storage subsystem 200 includes storage devices 202, interface 204, interface 206, cache memory 208, processors 210–224, and shared memory 226.

Interfaces 204 and 206 in storage subsystem 200 provide a communication gateway through which communication between a data processing system and storage subsystem 200 may occur. In this example, interfaces 204 and 206 may be implemented using a number of different mechanisms, such as ESCON cards, SCSI cards, fiber channel interfaces, modems, network interfaces, or a network hub. Although the depicted example illustrates the use of two interface units, any number of interface cards may be used depending on the implementation.

In this example, storage subsystem 200 is a shared virtual array. Storage subsystem 200 is a virtual storage system in that each physical storage device in storage subsystem 200 may be represented to a data processing system, such as client 108 in FIG. 1, as a number of virtual devices. In this example, storage devices 202 are a set of disk drives set up as a redundant array of independent disks (RAID) system. Of course, other storage devices may be used other than disk drives. For example, optical drives may be used within storage devices 202. Further, a mixture of different device types may be used, such as, disk drives and tape drives.

Data being transferred between interfaces 204 and 206 and storage devices 202 are temporarily placed into cache memory 208. Additionally, cache memory 208 may be accessed by processors 210–224, which are used to handle reading and writing data for storage devices 202. Shared memory 226 is used by processors 210–224 to handle and track the reading and writing of data to storage devices 202.

Figure 3:
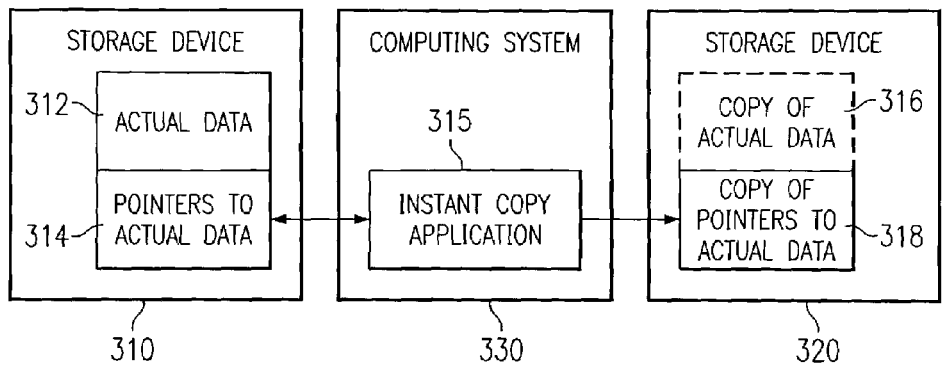
FIG. 3 is an exemplary diagram illustrating an instant copy operation.

FIG. 3 is an exemplary block diagram illustrating an instant copy operation. The instant copy operation illustrated in FIG. 3 may be performed on the storage subsystem illustrated in FIG. 2 above. It should be appreciated, however, that the instant copy operations of the present invention are not limited to any particular storage system or computing system architecture or configuration and may be implemented in any number of different computing and storage systems without departing from the spirit and scope of the present invention.

As shown in FIG. 3, actual data 312 is stored in a first data storage area of a first storage device 310. A set of pointers to the actual data 314 is stored in a pointer table, or mapping table, of a pointer storage area of the first storage device 310. A second storage device 320 is provided to which the actual data 312 is to be copied using an instant copy operation. While the second storage device 320 is depicted as a separate storage device for clarity, in actuality the second storage device 320 may be a different storage area of the first storage device 310.

When the instant copy of the actual data 312 stored in the first storage device 310 is to be performed, an instant copy application 322 of a computing system 330 associated with the first and second storage devices 310 and 320 is used to perform an instant copy of the pointers in the pointer table of storage device 310. The instant copy operation involves generating duplicate pointers 318 to the actual data 312 stored on the storage device 310. The instant copy operation does not copy the data 312 from the original area to the copy area 316. Rather, the copy pointers 318 still point at the original actual data storage area 312 rather than the copy data area 316. As data is changed in either the original or in the copy, the differences are recorded. This is done in the case of writing to the actual data 312 by first copying the data to be changed from the actual data 312 to the copy data 316. This is done in the case of writing to the copy data by writing the changed data directly to the copy data area 316.

Figure 4:
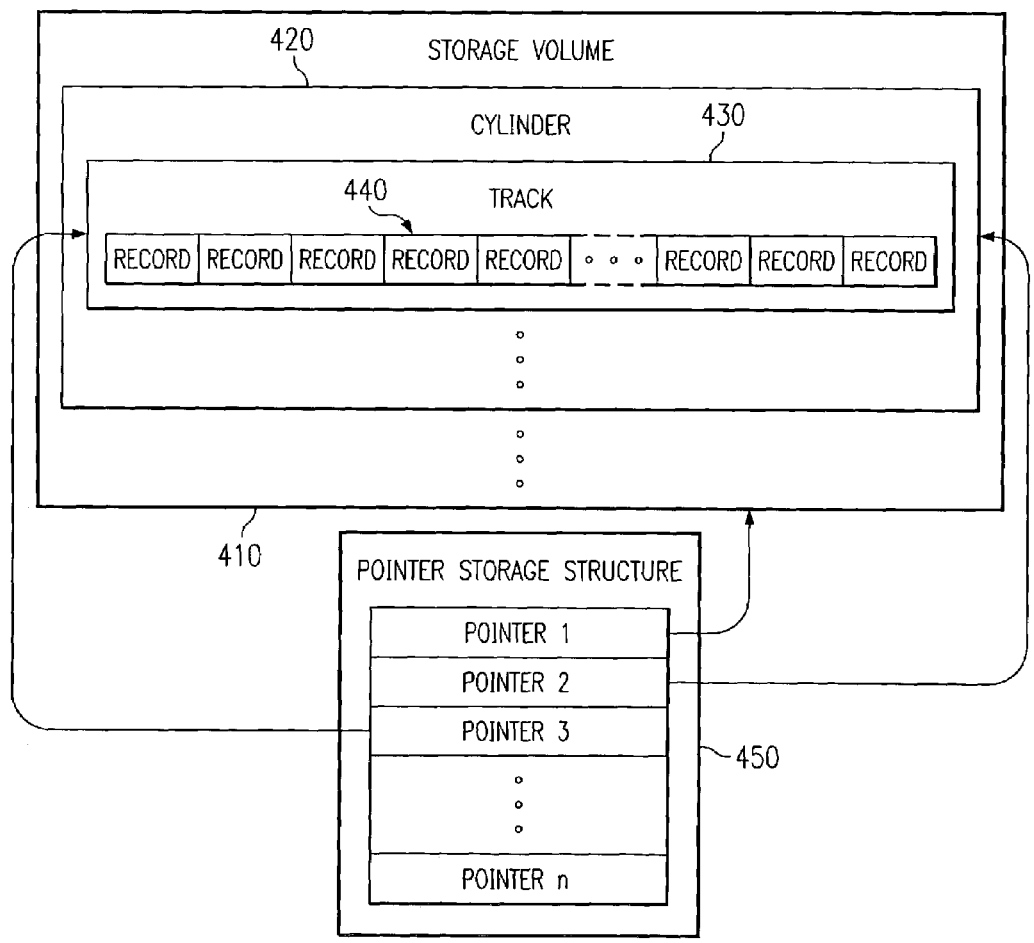
FIG. 4 is an exemplary diagram illustrating a known pointer system for pointing to storage locations of data.

As mentioned previously, and illustrated in FIG. 4, the pointer systems used in known instant copy operations make use of fixed level pointers. That is, as shown in FIG. 4, the pointer storage structure 450, e.g., a pointer table, includes a plurality of pointers. The pointers may point to a storage volume 410, a cylinder 420, or a track 430 level of the data storage device. However, the level to which the pointer points is fixed. In the depicted example, pointer 1 points to a storage volume 410 level, pointer 2 points to a cylinder level 420, and pointer 3 points to a track level 430 of the data storage device.

Furthermore, the data written to the data storage device is written as records 440 of a track 430. Since the pointers in the pointer storage structure 450 only point to the volume, cylinder or track levels, in order for an operation to make use of an instant copy of the data, the operation must operate at the volume, cylinder or track level. In many cases, this is not an optimal solution since data does not always require an entire track of storage space.

Therefore, with known instant copy operations, the instant copy operation is limited in its usefulness to those functions that can operate at the fixed level to which the pointers are directed. That is, if volume level pointers are utilized in the pointer table 314, then when the pointers are duplicated, the result is a copy of volume level pointers. Thus, only functions that operate at the volume level can make use of the instant copy operation. Finer granularity operations will not be able to make optimal use of the instant copy operation and storage space is wasted unnecessarily in order to provide for instant copy operations.

For example, consider a web page comprised of a background and overlayed text. The background may only require a few bytes of data to characterize the background on the web page, however, in order to facilitate instant copy operations of the background data, an entire track of storage space is set aside for storing the background data. On a small scale, such wasted storage space may not pose a problem, but in large data storage systems, if a large number of tracks have unused space, there is a needless loss of storage capacity that require additional expense. For example, if a web site has multiple web pages, each page having a background and overlying text, each background would require its own track of storage space.

With the present invention, a compound pointer system is provided in which fixed level pointers are augmented with associated pointers to metadata describing lower level structures. With the present invention, the companion metadata describes these lower level structures in a manner independent of the actual data stored within the lower level structures. With such an enhanced compound pointer system, an instant copy mechanism can process the pointers to the underlying structures and take instant copies of much finer detail. This allows individual records of data to be represented by the pointer system without having the overhead of carrying a pointer to all the individual records. The instant copy mechanism not only copies the fixed level pointers, but resolves the companion pointers to individual subsets of a general granularity for the instances of the instant copy domains.

FIG. 5 illustrates the compound pointer system according to an exemplary embodiment of the present invention. As shown in FIG. 5, the pointer storage structure 510 includes a plurality of fixed level pointers 1 to n. Some of the pointers in the pointer storage structure 510 have associated pointers 1 to k in an associated pointer storage structure 520. The associated pointer for a fixed level pointer (indicated in the drawing by a dotted line) is identified based on metadata of the fixed level pointers associated with the pointer storage structure 510. The metadata for the fixed level pointers are included in the system operations and may include for example:

Level 1 pointer—Volume name, volume system address

Level 2 pointers—Cylinder address within volume

Level 3 pointers—Track address within cylinder

The associated pointers are pointers to generic structure information in the generic structure information metadata 530. In the example show in FIG. 5, fixed level pointer 3 has associated pointer 2 that points to generic structure information 1.

The generic structure information identifies a general structure of a lower level of data storage for the data referenced by the fixed level pointer, e.g., pointer 3. For example, the generic structure information may designate the lower level data structure to be fixed size blocks of data, variable size blocks of data. The metadata for the associated pointers might contain such information as:

Record format description(s) (this could be the fixed length of each of a series of related records that relate to a specific web server customization option such as background scene, hot link positioning, banner positioning, etc.)

Record count(s) (this could be the number of records or the number of record sets). The same generic structure information may be used for a plurality of different portions of data. Thus, for example, track pointers 1 through 10 of a specific cylinder may all point to generic structure information 1.

The generic structure information can hold the lower level structure information or an algorithm that allows one to calculate the boundaries of the lower level structure. In addition it can include a pointer to a structure data set in structure data 540. The structure data set includes additional information about the specific structure of the data pointed to by the fixed level pointers in pointer storage structure 510. A pointer, such as structure pointer 1, to structure level data 540 would be used in the case where the description of the lower level structure information is extremely complex and requires a large storage area. It would also be useful if it is extremely popular and is used in a multiplicity of different higher level structures (such as used in a number of virtual volume descriptions). With the use of associated pointers in accordance with the present invention, varying levels of data structure information may be obtainable for use in instant copy operations. As a result, instant copy operations are not limited to the fixed level of specificity in known instant copy operations.

Rather than having to store data and reference that data in terms of tracks in order to facilitate the possibility of instant copies, the present invention allows for data records to be the subject of instant copy operations. As a result, wasted storage space may be kept at a minimum. For example, if a web site has a number of web pages each having a background and overlying text, each background may be stored in separate records of the same track rather than having to store each background in a different track. Each background may be independently the subject of an instant copy operation by virtue of the fact that the instant copy operation may obtain access to the lower level structure information via the associated pointer and the generic structure information and structure data.

With the present invention, the instant copy application may perform an instant copy on tracks that do and do not have associated pointers. With the tracks that do not have associated pointers, the instant copy operation functions in the known way. However, with tracks having associated pointers, the instant copy can be performed on individual records of the track identified by the fixed level pointer. Thus, if a fixed level pointer has an associated pointer, as determined from metadata associated with the fixed level pointer, the associated pointer is copied along with the fixed level pointer to the instant copy area. Thereafter, if an operation makes use of the instant copy, the operation may obtain access to the individual records identified by the associated pointer rather than having to perform operations at a track level. Another significant benefit of the associated lower level metadata is that it resolves the problem that the using system often requires information at the record level and the storage system cannot afford to maintain pointers at a record level.

FIG. 6 is a flowchart outlining an exemplary operation of the present invention for performing an instant copy of a portion of data having fixed level pointers and one or more associated pointers. As shown in FIG. 6, the operation starts with receiving a request for an instant copy operation to be performed on a portion of data (step 610). The request for the instant copy is stated at a resolution that is lower than the pointers maintained by the subsystem (for example, the copy may request volume A, cylinder X, track I, and records 10, 11, and 12). The metadata for the designated instant copy portion of data is read (step 620). The instant copy operation is performed on the superstructure, or fixed layer, pointers for the designated instant copy portion of data (step 630) (e.g., the pointers for track I of cylinder X of volume A are copied). Any associated pointers for this portion of data are then identified based on the metadata (step 640). These associated pointers, if any, are then instant copied (step 650) and the bounds of the metadata identified by these pointers are set according to the information provided within the request the request. In this example, the metadata identifies that the track contains 25 sets of three records each, so the instant copy is modified to indicate that only the $4^{th}$ set of records have been copied. The operation then ends. It can be seen here that where the associated pointers are omitted, the entire track of information must be referenced and used by the system requesting the copy. Without using the associated pointers, on one set of records can be placed on each track. An additional benefit of using the associated pointers is that where all the tracks of a cylinder have the same lower level (e.g., record level) structure, only one associated pointer need be stored for the entire cylinder (and so forth on up through the pointer hierarchy).

Thus, the present invention provides a mechanism by which varying levels of data specificity are possible with instant copy operations. With the present invention, data may be stored in more compact areas to thereby decrease the amount of wasted storage space. Through the use of fixed level pointers and associated pointers identifying the underlying structure of the data referenced by the fixed level pointers, operations may make use of individual records of data in an instant copy of the data.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A compound pointer structure for use by a computing device for providing instant copy operations for stored data in a data storage system, comprising:
   a set of fixed-level pointers containing at least a first pointer and a second pointer, each of the set of fixed-level pointers pointing to a fixed level of the stored data;
   first structure information that indicates a method to determine the location of a plurality of first data structures having a finer granularity than the fixed level without having pointers to each of the plurality of first data structures; and
   wherein the first pointer has an associated pointer that points to a the first structure information, and the second pointer does not have an associated pointer, wherein first instant copy operations are performed at a granularity described by said structure information and second instant copy operations are performed at a granularity described by the fixed level.

2. The compound pointer structure of claim 1, wherein the fixed level is one of a volume level, cylinder level, and track level.

3. The compound pointer structure of claim 1, wherein the first structure information further includes an additional pointer to a structure level data set.

4. The compound pointer structure of claim 1, wherein instant copy operations performed on data at a location pointed to by the first pointer are performed at a granularity indicated by the structure information and instant copy operations performed on data at a location pointed to by the second pointer are performed at the granularity of the fixed level.

5. The compound pointer structure of claim 1, further comprising metadata associated with the first pointer, the metadata identifying the associated pointer.

6. The compound pointer structure of claim 1, wherein a same portion of the first structure information describes different portions of data stored in the data storage system.

7. The compound pointer structure of claim 1, wherein the structure information includes an algorithm that can be used to calculate boundaries of a lower level data structure.

8. The compound pointer structure of claim 1, wherein associated pointer has associated metadata, and wherein the associated metadata identifies at least one of a record format description and a record count.

9. A method, in a computing device, for performing instant copy operations in a data storage system, the method comprising:
   copying a first pointer that points to a fixed level of the stored data;
   determining if the first pointer has an associated second pointer; and
   if the first pointer has an associated second pointer, copying the second pointer, wherein the second pointer points to a portion of structure information that indicates a method to determine the location of a plurality of data structures having a finer granularity than the fixed level without having pointers to each of the plurality of data structures.

10. The method of claim 9, further comprising:
receiving a request for copying the data from the one location to the another location.

11. The method of claim 10, further comprising:
setting bounds of the portion of structure information based on the portion of data to be copied identified in the received request.

12. The method of claim 11, wherein setting bounds of the portion of structure information includes using an algorithm provided in the structure information for determining boundaries of a lower level data structure.

13. The method of claim 9, wherein the fixed level is one of a volume level, cylinder level, and track level.

14. The method of claim 9, wherein the portion of the structure information further includes a third pointer to a structure level data set.

15. The method of claim 9, wherein the portion of the structure information describes the format of the data in a manner independent of the actual data.

16. The method of claim 9, wherein determining if the first pointer has an associated second pointer includes reading metadata associated with the first pointer, wherein the associated metadata identifies the second pointer.

17. The method of claim 9, wherein a same portion of the structure information is used for different portions of data stored in the data storage system.

18. The method of claim 9, further comprising performing instant copy operations on data at a location pointed to by the first pointer, wherein if the first pointer has an associated second pointer, the instant copy operations are performed at a granularity indicated by the structure information and if the first pointer does not have an associated second pointer, the instant copy operations are performed at the granularity of the fixed level.

19. The method of claim 9, wherein the second pointer has associated metadata, and wherein the associated metadata identifies at least one of a record format description and a record count.

20. A computer program product in a computer readable medium for performing instant copy operations in a data storage system, the computer program product comprising:
first instructions for copying a first pointer that points to a fixed level of the stored data;
second instructions for determining if the first pointer has an associated second pointer; and
third instructions for copying a second pointer associated with the first pointer, if the first pointer has an associated second pointer, wherein the second pointer points to a portion of structure information that indicates a method to determine the location of a plurality of data structures having a finer granularity than the fixed level without having pointers to each of the plurality of data structures.

21. The computer program product of claim 20, further comprising:
fourth instructions for receiving a request for copying the data from the one location to another location.

22. The computer program product of claim 21, further comprising:
fifth instructions for setting bounds of the portion of structure information based on the portion of data to be copied identified in the received request.

23. The computer program product of claim 22, further comprising fourth instructions for performing instant copy operations on data at a location pointed to by the first pointer, wherein if the first pointer has an associated second pointer, the instant copy operations are performed at a granularity indicated by the structure information and if the first pointer does not have an associated second pointer, the instant copy operations are performed at the granularity of the fixed level.

24. The computer program product of claim 20, wherein the first and third instructions include instructions for using an instant copy operation to perform the copying of the first pointer and the copying of the second pointer, respectively.

25. The computer program product of claim 20, wherein the fixed level is one of a volume level, cylinder level, and track level.

26. The computer program product of claim 20, wherein the portion of the structure information further includes a third pointer to a structure level data set.

27. The computer program product of claim 20, wherein the portion of the structure information describes the format of the data in a manner independent of the actual data.

28. The computer program product of claim 20, wherein the second instructions for determining if the first pointer has an associated second pointer include instructions for reading metadata associated with the first pointer, wherein the associated metadata identifies the second pointer.

29. The computer program product of claim 20, wherein a same portion of the structure information is used for different portions of data stored in the data storage system.

30. The computer program product of claim 20, wherein the portion of the structure information includes an algorithm that can be used to calculate boundaries of a lower level data structure.

31. The computer program product of claim 20, wherein the second pointer has associated metadata, and wherein the associated metadata identifies at least one of a record format description and a record count.

32. An apparatus for performing instant copy operations in a data storage system, comprising:
means for copying a first pointer that points to a fixed level of the stored data;
means for determining if the first pointer has an associated second pointer; and
means for copying a second pointer associated with the first pointer, if the first pointer has an associated second pointer, wherein the second pointer points to a portion of structure information that indicates a method to determine the location of a plurality of storage structures having a finer granularity than the fixed level without having pointers to each of the plurality of storage structures.

33. The apparatus of claim 32, further comprising means for performing instant copy operations on data at a location pointed to by the first pointer, wherein if the first pointer has an associated second pointer, the instant copy operations are performed at a granularity indicated by the structure information and if the first pointer does not have an associated second pointer, the instant copy operations are performed at the granularity of the fixed level.

* * * * *